(12) United States Patent
Moritani et al.

(10) Patent No.: US 9,824,284 B2
(45) Date of Patent: Nov. 21, 2017

(54) TRAFFIC SIGN RECOGNITION SYSTEM

(71) Applicant: Mazda Motor Corporation, Aki-gun, Hiroshima (JP)

(72) Inventors: Takayuki Moritani, Hiroshima (JP); Yasutaka Otsubo, Aki-gun (JP); Tsuyoshi Arinaga, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/353,054

(22) Filed: Nov. 16, 2016

(65) Prior Publication Data

US 2017/0154228 A1    Jun. 1, 2017

(30) Foreign Application Priority Data

Nov. 26, 2015    (JP) .................................. 2015-230221

(51) Int. Cl.
*G06K 9/00*    (2006.01)
*G08G 1/0967*    (2006.01)

(52) U.S. Cl.
CPC ....... *G06K 9/00818* (2013.01); *G08G 1/0967* (2013.01)

(58) Field of Classification Search
CPC ............. G06K 9/00818; G08G 1/0967; G08G 1/096783
See application file for complete search history.

(56) References Cited

U.S. PATENT DOCUMENTS

| | | | | |
|---|---|---|---|---|
| 6,385,529 B1* | 5/2002 | Minowa | ............. | B60K 31/0008 701/300 |
| 2009/0237269 A1* | 9/2009 | Okugi | ....................... | B60R 1/00 340/901 |
| 2009/0312888 A1* | 12/2009 | Sickert | ................. | G08G 1/0962 701/1 |
| 2012/0154591 A1* | 6/2012 | Baur | ......................... | B60R 1/00 348/148 |
| 2014/0200759 A1* | 7/2014 | Lu | .......................... | B60D 1/245 701/28 |

(Continued)

FOREIGN PATENT DOCUMENTS

JP    2014120111 A    6/2014

*Primary Examiner* — Sisay Yacob
(74) *Attorney, Agent, or Firm* — Alleman Hall Creaseman & Tuttle LLP

(57) ABSTRACT

A traffic sign recognition system includes a display for displaying caution information regarding a traffic sign ahead of a vehicle, and a processor configured to execute a viewing direction detecting module for detecting a viewing direction of a driver, a traffic sign detecting module for detecting the traffic sign, and a viewing condition detecting module for detecting a viewing condition of the traffic sign. The processor controls the display to display the caution information when the detected viewing direction is different from a direction of the detected traffic sign, controls the display to refrain from displaying the caution information when the detected viewing direction is toward the detected traffic sign, and when the viewing condition detecting module detects a low viewing condition of the traffic sign, controls the display to display the caution information even when the detected viewing direction matches the direction of the detected traffic sign.

6 Claims, 3 Drawing Sheets

(56) References Cited

U.S. PATENT DOCUMENTS

2016/0180182 A1* 6/2016 Gupta ................ G06K 9/00805
                                                          348/148
2017/0103272 A1* 4/2017 Satomura ........... G06K 9/00818

* cited by examiner

STRAIGHT AHEAD AND LEFT TURN PERMITTED
(RIGHT TURN PROHIBITED)

TRAFFIC SIGN RECOGNITION SYSTEM

BACKGROUND

The present invention relates to a traffic sign recognition system.

In view of preventing danger etc., it is undesirable to be unaware of a traffic sign installed on a road. JP2014-120111A discloses an art in which a detector for detecting a line of sight of a driver driving a vehicle is provided and if a viewing direction (line of sight) of the driver does not match with a direction of a traffic sign ahead of the vehicle, it is considered that the traffic sign is not viewed by the driver and caution information is displayed.

Incidentally, even when the viewing direction of the driver matches with a direction of a traffic sign, it cannot be said for sure that the traffic sign is viewed by the driver. In other words, for example, in an environment with poor visibility, such as when a surrounding of a traffic sign is dark at night or in snow or rain, it is difficult to see the traffic sign itself clearly. Therefore, even if the viewing direction of the driver matches with the direction of the traffic sign, the driver often does not notice the traffic sign or cannot clearly understand the meaning of the traffic sign.

SUMMARY

The present invention is made in view of the above issues and aims to provide a traffic sign recognition system, that is capable of transmitting information on a traffic sign to a driver more reliably.

According to one aspect of the present invention, a traffic sign recognition system is provided. The system includes a display unit for displaying, for a driver of a vehicle, caution information regarding a traffic sign ahead of the vehicle, and a processor configured to execute a viewing direction detecting module for detecting a viewing direction of the driver, a traffic sign detecting module for detecting the traffic sign, and a viewing condition detecting module for detecting a viewing condition indicating visibility of the traffic sign. The processor is configured to control the display unit to display the caution information regarding the detected traffic sign when the detected viewing direction of the driver is different from a direction of the detected traffic sign, and to control the display unit to refrain from displaying the caution information when the detected viewing direction of the driver matches with the direction of the detected traffic sign, and when the viewing condition detecting module detects a low viewing condition of the traffic sign, the processor is configured to controls the display unit to display the caution information even when the detected viewing direction of the driver matches with the direction of the detected traffic sign.

According to the above configuration, when the viewing direction of the driver matches with the direction of the traffic sign, the caution information is refrained from being displayed so as to lower a possibility of making the driver feel annoyed from displaying the caution information. Whereas, when the viewing direction is different from the direction of the traffic sign, the caution information is displayed to bring it to the attention of the driver. Further, when the visibility of the traffic sign is low, the caution information is displayed even when the viewing direction of the driver matches with the direction of the traffic sign. Thus, the information on the traffic sign can be transmitted to the driver more reliably.

The viewing condition detecting module may detect the low viewing condition at night. This is preferable in transmitting the information on the traffic sign to the driver more reliably when the vehicle travels at night at which the visibility of the traffic sign becomes low.

The viewing condition detecting module may detect the low viewing condition when the vehicle is inside a tunnel. This is preferable in transmitting the information on the traffic sign to the driver more reliably when the vehicle travels inside the tunnel in which the visibility of the traffic sign becomes low.

The viewing condition detecting module may detect the low viewing condition in one of rain, snow, and thick fog. This is preferable in transmitting the information on the traffic sign to the driver more reliably when the vehicle travels in one of rain, snow, and thick flog in which the visibility of the traffic sign becomes low.

The viewing direction detecting module may also detect an opening degree of eyes of the driver. The viewing condition detecting module may detect the low viewing condition when the detected opening degree of eyes of the driver is small. Here, when the opening degree of the eyes of the driver is small, the possibility that the traffic sign is not clearly viewed by the driver is high. In such a state, displaying the caution information is preferable in transmitting the information on the traffic sign to the driver more reliably.

The viewing condition detecting module may detect the low viewing condition when the vehicle faces a high intensity light. This is preferable in transmitting the information on the traffic sign to the driver more reliably when the vehicle faces the high intensity light, which is when the visibility of the traffic sign becomes low.

DETAILED DESCRIPTION OF EMBODIMENT

Figure 1:
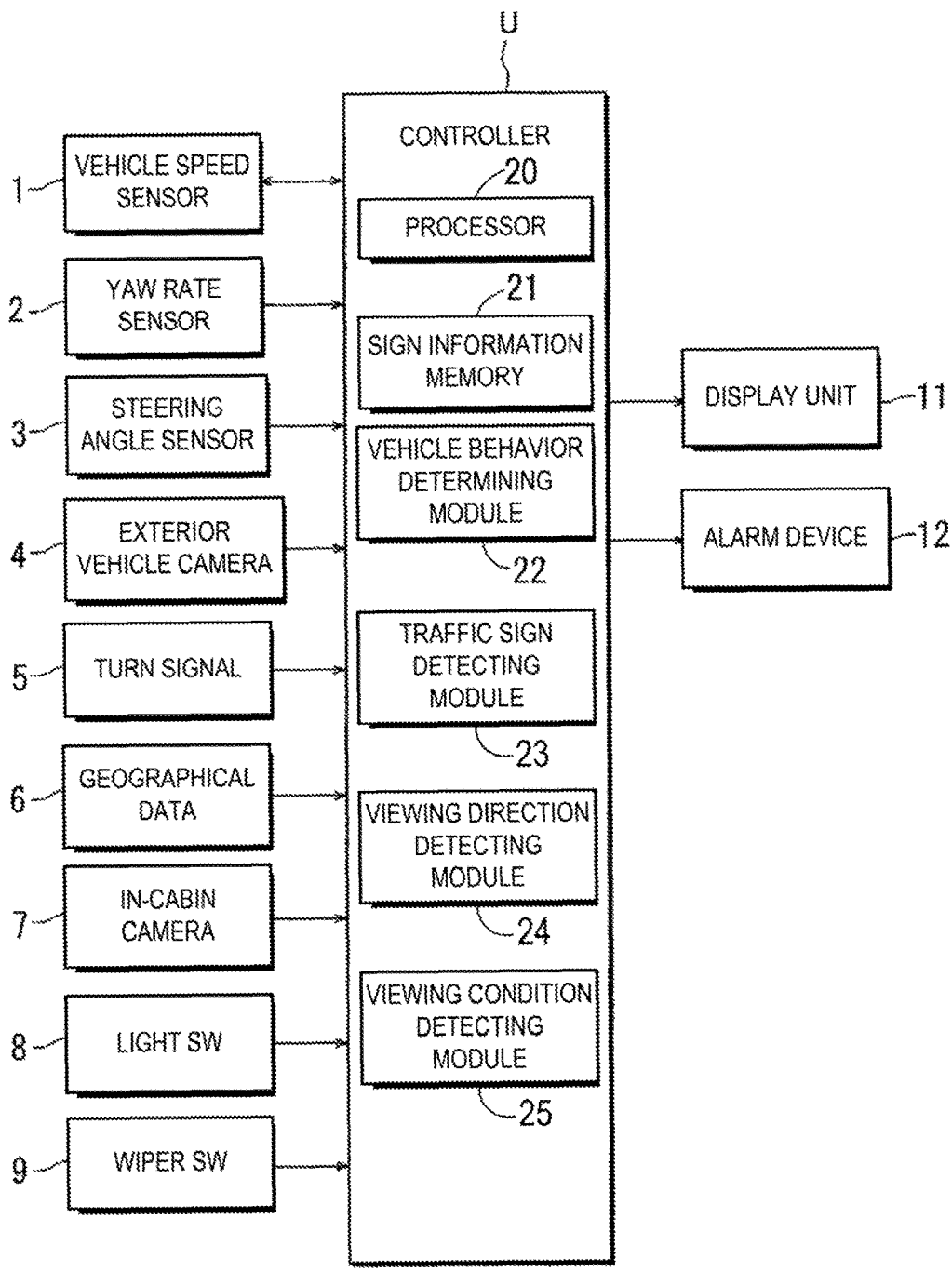
FIG. 1 is a block diagram illustrating an example of a control system according to the present invention.

In FIG. 1, the reference character "U" is a controller (control unit) configured by using a microcomputer, and including a processor 20. The controller U receives signals from various sensors or devices 1 to 9. Specifically, the reference character "1" is a vehicle speed sensor for detecting a vehicle speed. The reference character "2" is a yaw rate sensor for detecting a yaw rate which applies to a vehicle concerned (hereinafter, simply referred to as "the vehicle"). The reference character "3" is a steering angle sensor for detecting a steering angle (including a steering direction). The reference character "4" is an exterior vehicle camera for imaging a view forward of the vehicle, and it detects existence of a traffic sign ahead of the vehicle (including traffic lights installed at an intersection). The reference character "5" is a turn signal indicator (direction indicator) for detecting an intention of a driver of the vehicle for turning either right or left. The reference character "6" is a geographical data acquiring system (navigation system) for procuring information regarding the existence of traffic signs and a road condition ahead of the vehicle. The reference character "7" is an in-cabin camera for detecting a line of sight of the driver of the vehicle in order to detect whether the traffic sign ahead of the vehicle is viewed, and also detecting an opening degree of eyes of the driver. The reference character "8" is a light switch (particularly a headlight switch) which detects, when turned on, a low viewing condition of the traffic sign due to being in a dark surrounding, such as at night. The reference character "9" is a wiper switch which detects, when turned on, a low viewing condition of the traffic sign due to rain, snow or the like. Note that, the sensors 1 to 3 and 5 are not directly related to this embodiment and are used for a different control from a control described below.

The controller U controls a display unit 11 and an alarm device 12 via a processor 20 of the controller U. The display unit 11 displays caution information regarding the traffic sign. This display unit 11 may be configured by a display provided in front of a steering wheel, a head-up display, and/or a display for navigation system. Further the alarm device 12 may be a display type using a display separately provided from the display unit 11, voice guidance or a buzzer which issues an alarm sound, or a device using both of the alarm on display and the alarm by sound.

The controller U includes a sign information memory 21 for storing image data of various traffic signs and meanings thereof in association with each other (creating a database). Further, the controller U includes a vehicle behavior determining module 22 for determining, particularly, a behavior (especially, a traveling direction) of the vehicle. Note that, the vehicle behavior determining module 22 is not directly related to this embodiment and is used for a different control from the control described below.

Figure 2:
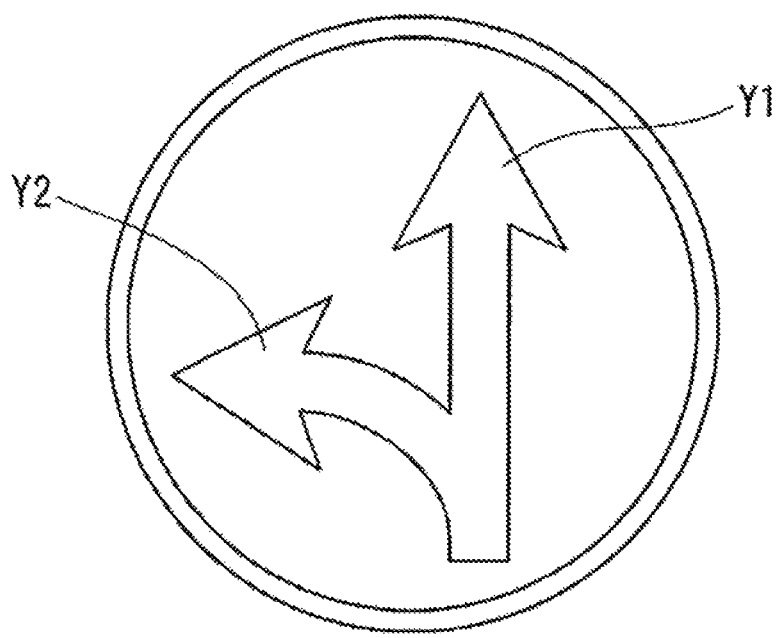
FIG. 2 is a view illustrating an example of a traffic sign which prohibits proceeding to directions other than a given direction.

FIG. 2 is a view illustrating an example of the traffic sign, a traffic sign which prohibits vehicles to proceed in directions other than a given direction. In the example of FIG. 2, a straight ahead arrow Y1 and a leftward arrow Y2 are displayed, which indicates that proceeding straight ahead or making a left turn is permitted, whereas proceeding in other directions therefrom is prohibited (e.g., a right turn is prohibited). Note that the traffic sign illustrated in FIG. 2 is merely an example, and the present invention is targeted also to other examples of the traffic sign, including traffic lights.

Figure 3:
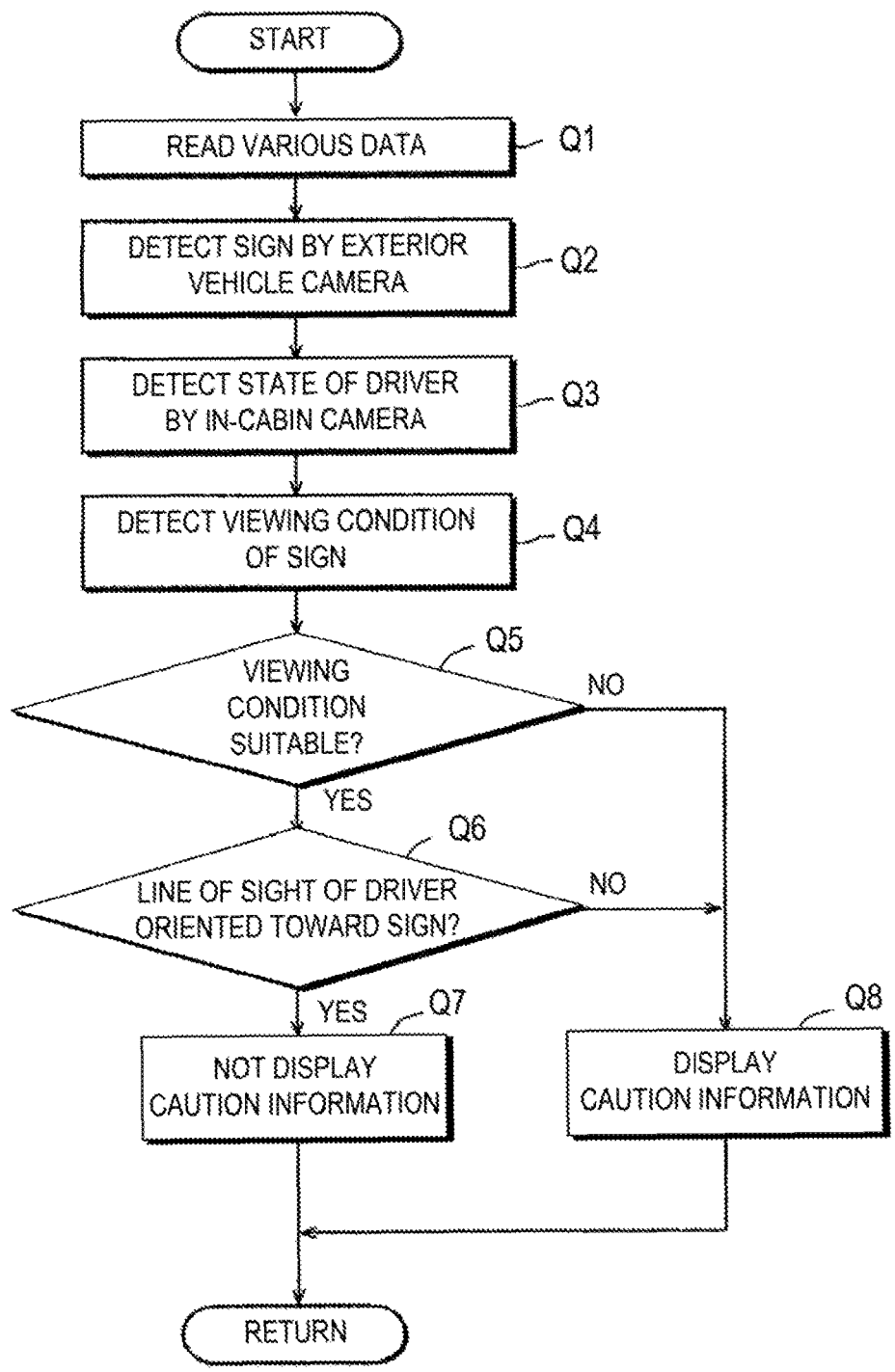
FIG. 3 is a flowchart illustrating an example of a control according to the present invention.

Next, an example of the control according to the present invention is described with reference to FIG. 3. Note that in the following description, "Q" indicates each process. First in Q1, the signals from the various sensors or the devices 1 to 9 are received. In Q2, the traffic sign stored in the sign information memory 21 is detected from view(s) imaged by the exterior vehicle camera 4 (a meaning of the detected traffic sign is determined), and also a direction of the detected traffic sign (a direction toward the location of the detected traffic sign) is determined. Then in Q3, the in-cabin camera 7 detects the line of sight of the driver.

Then in Q4, a viewing condition indicating visibility of the traffic sign is detected. Specifically, the viewing condition is determined as poor (visibility is low) when at least one of the light switch 8 and the wiper switch 9 is in an ON state. In other words, the viewing condition is determined as suitable (visibility is high) when both of the light switch 8 and the wiper switch 9 are in an OFF state. Further, the viewing condition is determined as poor (low) also when the opening degree of eyes of the driver detected by the in-cabin camera 7 is below a given value (the opening degree of eyes becomes smaller when the driver is sleepy, exposed to bright light, or loses his/her concentration).

Then in Q5, whether the viewing condition is suitable is determined based on the detection result of Q4. If the determination result of Q5 is positive, in Q6, whether the line of sight of the driver (the direction detected by the in-cabin camera 7) is oriented toward the direction of the detected traffic sign (the direction detected by the exterior vehicle camera 4) is determined. If the determination result of Q6 is positive, in Q7, the traffic sign is considered as viewed by the driver and the display unit 11 does not display the caution information (reducing annoyance to the driver by not displaying unnecessary caution information).

If the determination result of Q6 is negative, in Q8, the traffic sign is considered as not viewed by the driver and the display unit 11 displays the caution information regarding the detected traffic sign. Note that when the detected traffic sign is the same as the sign illustrated in FIG. 2, the display contents of the caution information may be, for example, an illustration of "× mark on a rightward arrow" or letters "Right turn prohibited." Further, if the vehicle is about to proceed to a prohibited direction, the alarm device 12 may be activated as well (e.g., voice guidance pronouncing "Right turn is prohibited"). Note that, the issuance of the alarm may be limited to a dangerous situation (e.g., if the traffic sign indicates a speed limit and the vehicle speed is slightly above the speed limit, caution information, for example, "OVERSPEED" is displayed to attract an attention, or if the vehicle speed is greatly above the speed limit, an alarm by voice guidance, for example, "EXCESS OVERSPEED" may be issued). Note that caution information which is displayed corresponding to traffic signs is stored in the sign information memory 21 of the controller U, in association with the individual traffic signs.

If the determination result of Q5 is negative, i.e., the visibility of the traffic sign is low, the control proceeds to Q8 where the caution information is displayed. The transition from Q5 to Q8 is performed even if the direction of the detected traffic sign matches with the viewing direction of the driver. Specifically, when considering a possibility of being unaware of the traffic sign itself due to low visibility of the traffic sign and, even if the traffic sign is viewed, falsely understanding the meaning the traffic sign, these unawareness and false understanding are prevented.

Although the embodiment is described above, the present invention is not limited to this, and may suitably be modified within the scope of the claims. Examples of the low viewing condition may suitably include traveling inside a tunnel (e.g., this situation is detected by using geographical data or the exterior vehicle camera 4), in thick fog (e.g., a fog lamp switch is turned on), or when facing high intensity light (e.g., sunlight or a beam from a headlight of a vehicle on the opposite traffic lane) (e.g., this situation is detected by the exterior vehicle camera 4). The direction of the traffic sign may be detected by, other than the camera, using a radar. Each one or a combination of two or more of the group of processes of the flowchart indicates a function of the controller U, and by adding "module" to the name/phrase indicating the function, it is possible to consider them as software components of the controller. For example, the controller U may comprise the vehicle behavior determining module 22 executable by the processor 20 of the controller U to detect the traveling direction of the vehicle via at least one of the steering angle sensor 3, the turn signal 5, and the yaw rate sensor 2; a specific traffic sign detecting module 23 executable by the processor 20 to detect the specific traffic sign ahead of the vehicle via the exterior vehicle camera 4; a viewing direction detecting module 24 executable by the processor 20 to detect whether the specific traffic sign is viewed by the driver of the vehicle via the in-cabin camera 7; a viewing condition detecting module 25 executable by the processor 20 to detect the viewing condition indicating the visibility of the traffic sign via the light switch 8 and/or wiper switch 9. The purpose of the present invention is not limited to the explicitly described purpose, and also implicitly includes providing what is expressed as practically preferable or advantageous.

According to the present invention, it is possible to transmit information on a traffic sign to a driver more reliably.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

U Controller
4 Exterior Vehicle Camera (For Traffic Sign Detection)
7 In-cabin Camera (For Driver's Line of Sight Detection)
11 Display Unit
12 Alarm Device
21 Sign Information Memory

What is claimed is:

1. A traffic sign recognition system, comprising:
a display unit for displaying, for a driver of a vehicle, caution information regarding a traffic sign ahead of the vehicle; and
a processor configured to execute:
a viewing direction detecting module for detecting a viewing direction of the driver;
a traffic sign detecting module for detecting the traffic sign;
a viewing condition detecting module for detecting a viewing condition indicating visibility of the traffic sign; wherein
the processor is configured to control the display unit to display the caution information regarding the detected traffic sign when the detected viewing direction of the driver is different from a direction of the detected traffic sign, and controlling the display unit to refrain from displaying the caution information when the detected viewing direction of the driver matches with the direction of the detected traffic sign, and
wherein when the viewing condition detecting module detects a low viewing condition of the traffic sign, the processor controls the display unit to display the caution information even when the detected viewing direction of the driver matches with the direction of the detected traffic sign.

2. The system of claim 1, wherein the viewing condition detecting module detects the low viewing condition at night.

3. The system of claim 1, wherein the viewing condition detecting module detects the low viewing condition when the vehicle is inside a tunnel.

4. The system of claim 1, wherein the viewing condition detecting module detects the low viewing condition in one of rain, snow and thick fog.

5. The system of claim 1, wherein the viewing direction detecting module also detects an opening degree of eyes of the driver, and
wherein the viewing condition detecting module detects the low viewing condition when the detected opening degree of eyes of the driver is small.

6. The system of claim 1, wherein the viewing condition detecting module detects the low viewing condition when the vehicle faces a high intensity light.

* * * * *